United States Patent
Olofsson (10) Patent No.: US 10,476,802 B2
(45) Date of Patent: Nov. 12, 2019

(54) SYSTEM AND METHOD FOR REACTIVE PATH SELECTION

(71) Applicant: Cisco Technology, Inc., San Jose, CA (US)

(72) Inventor: Lars Olof Stefan Olofsson, Dubai (AE)

(73) Assignee: Cisco Technology, Inc., San Jose, CA (US)

( * ) Notice: Subject to any disclaimer, the term of this patent is extended or adjusted under 35 U.S.C. 154(b) by 7 days.

(21) Appl. No.: 15/468,015

(22) Filed: Mar. 23, 2017

(65) Prior Publication Data
US 2018/0278512 A1    Sep. 27, 2018

(51) Int. Cl.
| H04L 12/851 | (2013.01) |
| H04L 1/00 | (2006.01) |
| H04L 12/815 | (2013.01) |
| H04L 12/721 | (2013.01) |
| H04L 12/707 | (2013.01) |
| H04L 12/725 | (2013.01) |

(52) U.S. Cl.
CPC .......... *H04L 47/2425* (2013.01); *H04L 1/004* (2013.01); *H04L 1/0009* (2013.01); *H04L 45/123* (2013.01); *H04L 45/124* (2013.01); *H04L 45/22* (2013.01); *H04L 45/302* (2013.01); *H04L 45/70* (2013.01); *H04L 47/22* (2013.01)

(58) Field of Classification Search
CPC ......... H04L 45/08; H04L 45/70; H04L 47/20; H04L 47/2425; H04L 47/627; H04L 41/50; H04L 41/5003; H04L 41/5019
See application file for complete search history.

(56) References Cited

U.S. PATENT DOCUMENTS

| 2012/0106428 | A1 | 5/2012 | Schlicht et al. |
| 2012/0224691 | A1* | 9/2012 | Purohit ............... H04L 1/04 380/255 |
| 2013/0223221 | A1* | 8/2013 | Xu ................. H04L 43/0876 370/235 |
| 2016/0037434 | A1 | 2/2016 | Gopal et al. |

OTHER PUBLICATIONS

International Search Report and Written Opinion from the International Searching Authority, dated Jun. 6, 2018, 6 pages, for corresponding International Patent Application No. PCT/US2018/024195.

* cited by examiner

Primary Examiner — Pao Sinkantarakorn
Assistant Examiner — Kabir U Jahangir
(74) Attorney, Agent, or Firm — Polsinelli PC (57) ABSTRACT

A method for routing is disclosed. The method comprises provisioning an endpoint in a network with a reactive path selection policy; monitoring, by the endpoint, current conditions relating to various paths available to said end point for the transmission of traffic; and selectively applying, by the endpoint, at least a portion of the reactive path selection policy based on the current conditions of the available paths.

20 Claims, 7 Drawing Sheets

SYSTEM AND METHOD FOR REACTIVE PATH SELECTION

FIELD

Embodiments of the present disclosure relate to systems and/or methods of reactive path selection.

BACKGROUND

Computer networking has largely been using dynamic routing protocols for finding the optimal path between two endpoints, with consideration taken only for the availability of endpoints and various forms of cost influencing which path may be selected as the preferred one out of a given set. The default operational mode of routing protocols has no consideration for the capability of the path to deliver the traffic from a quality perspective. The quality issue has been dealt with using other mechanisms including: (a) the use of probing techniques designed to determine packet loss, latency and jitter of the available paths and then using the collected data as input to a secondary path selection process; and (b) employing forward error correction to enable the receiving end to reconstitute messages subject to partial loss along the path enabling the delivery of a complete message to the destination.

Forward error correction is typically only applied to ensure that a given path is capable of delivering traffic despite challenging conditions, primarily related to loss of traffic. An acceptable implementation of forward error correction is typically capable of recovering and constituting the original packets sent despite a loss rate along the path as high as 10%.

The downside of using forward error correction is that using forward error correction requires additional traffic to be sent since the information necessary to reconstitute the original packets is sent in addition to the original traffic, thus consuming additional bandwidth. For this reason, forward error correction has significant drawbacks.

Furthermore, a common reactive measure to adapt to changing conditions in terms of available links, bandwidth or variation in Service Level Agreements (SLAs) is to limit the overall bandwidth available to all applications, to provide for an all-encompassing but equally impactful impairment across all applications and services transiting a device.

SUMMARY

According to a first aspect of the present disclosure, there is provided a technology to enable an endpoint such as an edge network device in a network to perform a reactive path selection based on predetermined criteria set by policy in advance of the reactive path selection.

According to a second aspect of the present disclosure, probes may be built into the endpoints of a path employing a method of quality measurement for each path available to the endpoint.

According to a third aspect of the present disclosure, a path selection mechanism may be built in to the endpoints capable of choosing paths based on multiple criteria (such as routing protocol metrics as well as path quality).

According to a fourth aspect of the present disclosure, an endpoint may define one or more local SLA-classes and actively find suitable paths for traffic assigned to each of the defined SLA-classes According to a fifth aspect of the present disclosure, an endpoint, via configuration, may establish a pre-determined behavior that is activated by the changing availability of useful transmission paths. The behavior is affected by both qualification and disqualification of transmission path resources.

According to a sixth aspect of the present disclosure, a change in routing path selection may be achieved based on the variation of path resources including, but not limited to, policing of certain application traffic at different rates, shaping of certain application traffic at different rates and dropping of application traffic. The rates may vary depending on the experienced impact on available and useful transmission path resources.

According to a seventh aspect of the present disclosure, an endpoint may be configured to only enable forward error correction as a last resort when no path is found that satisfies a given SLA requirement.

According to an eighth aspect of the present disclosure, an endpoint may accept configuration information dictating how path selection and forward error correction enablement interact.

According to a ninth aspect of the present disclosure, an endpoint may engage forward error correction interactively with no regard for the actual forward error correction algorithm employed (meaning that the present disclosure is not dependent on a specific forward error correction algorithm).

Other aspects of the present disclosure will be apparent from the detailed description below.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block or flow diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to the details are within the scope of the present disclosure. Similarly, although many of the features of the present disclosure are described in terms of each other, or in conjunction with each other, one skilled in the art will appreciate that many of these features can be provided independently of other features. Accordingly, the present disclosure is set forth without any loss of generality to, and without imposing limitations upon, the present disclosure.

Figure 1:
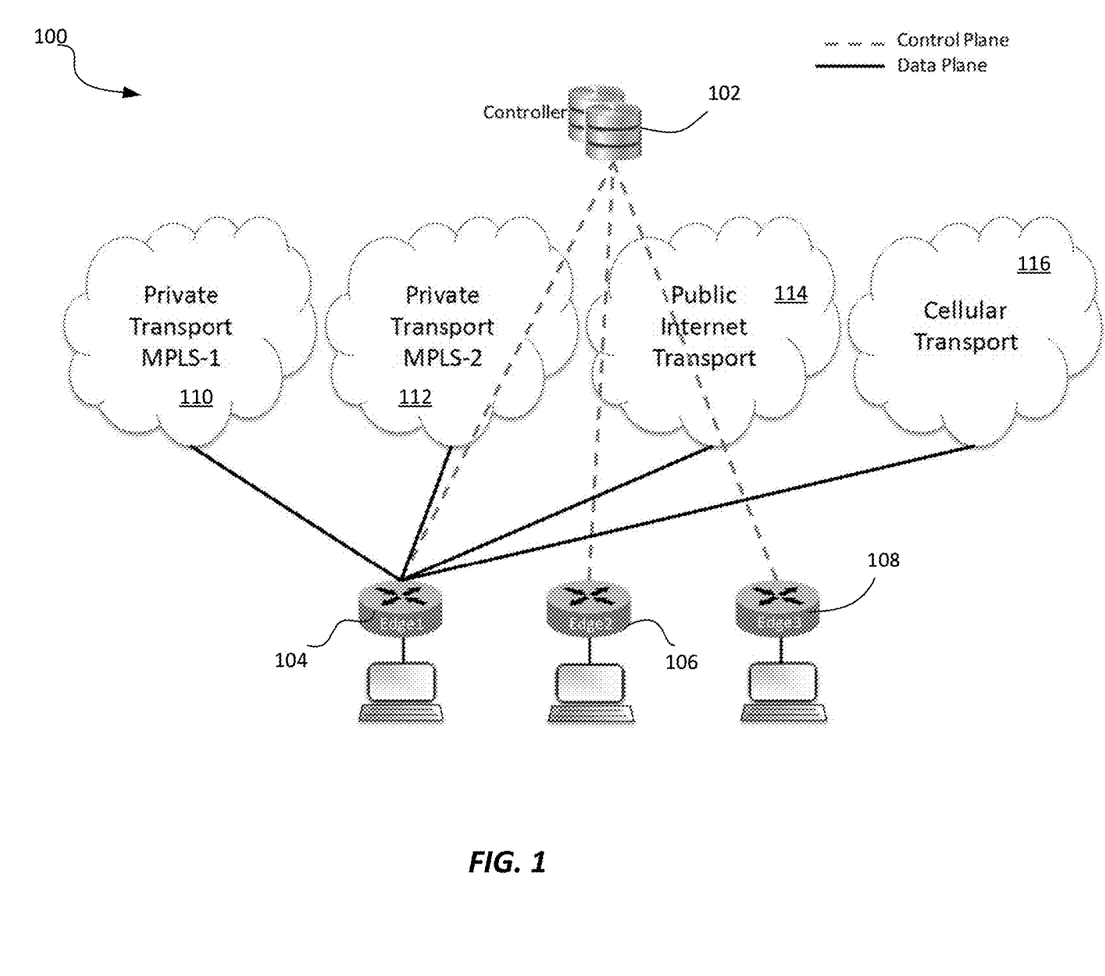
FIG. 1 shows a network comprising edge network devices capable of performing reactive path selection, in accordance with one embodiment of the present disclosure.

FIG. 1 illustrates a representative network 100, within which embodiments of the present disclosure may be practiced. The network 100 includes a control plane configured to facilitate the routing of data between various edge network devices in the network. A data plane established between the various edge network devices facilitates the actual routing of data traffic. The edge network devices may be referred to as endpoints.

In one embodiment, the control plane is established by a control device 102, which is configured to maintain control plane connections with various edge network devices of the network 100. In the example shown in FIG. 1, the control device 102 maintains control plane connections with edge network devices 104, 106, and 108. The actual number of edge network devices shown is not a limitation of the present disclosure, and it is to be understood that in a "real-world" deployment, the number of edge network devices may be significantly more. Moreover, in a real-world deployment there may be more than one control device 102.

Establishment of the control plane, and the data plane may be in accordance with the techniques described co-pending U.S. application Ser. Nos. 14/133,558, and 14/146,683, which are incorporated herein by reference in their entireties.

Each edge network device of the network 100 may have at its disposal a plurality of paths or links defining communication paths for the transmission of data packets to a remote edge network device. For the example of FIG. 1, the paths may include private transports 110, 112, a public transport 114, and a cellular transport 116. By way of example, the private transports 110 and 112 may be configured to support the MPLS protocol, the public transport 114 may support routing based on the Internet Protocol, and the cellular transport 116 may comprise the wireless network of a carrier, such as Verizon, or AT&T.

Broadly, embodiments of the present disclosure disclose a mechanism for each edge network device of the network 100 to perform a reactive path selection procedure to select one of the paths available to the edge network device for the transmission of data. Advantageously, the reactive path selection procedure may be based on changing bandwidth availability conditions and/or changing bandwidth quality conditions, as will be explained in greater detail below. In one embodiment, the reactive path selection procedure may be used to police bandwidth allocation on a per application basis. For example, such an approach may be applied in cases where there are no quality issues relating to the available paths, but merely capacity issues. In other embodiments, the reactive path selection procedure may implement the path selection based on a measure of quality, for example using forward error correction. For example, the path selection may be based on a measure of quality in cases where all paths are functional, but show differences in the quality of the available bandwidth.

In one embodiment, in order to enable reactive path selection, each edge network device maintains information on the capacity of each path, and information on the condition of each path.

For illustrative purposes, the table below provides example information on the various paths and their attributes for the paths illustrated in FIG. 1.

TABLE 1

Paths and Path Attributes

| Path Index | Type | Capacity | Path Management |
| --- | --- | --- | --- |
| 1 | Private Multi-Protocol Label Switching (MPLS) | 10 Mbps | Path Evaluation Forward Error Correction (FEC) Reactive Policing Reactive Shaping Reactive Dropping |
| 2 | Private MPLS | 5 Mbps | Path Evaluation FEC Reactive Policing Reactive Shaping Reactive Dropping |
| 3 | Broadband Internet | 20 Mbps | Path Evaluation FEC Reactive Policing Reactive Shaping Reactive Dropping |
| 4 | Long-Term Evolution (LTE) | 6 Mbps | Path Evaluation FEC Reactive Policing Reactive Shaping Reactive Dropping |

As noted above, each given edge network device of the network 100 has access to the transmission paths with capabilities as per the table above.

Additionally, the table shows the different techniques for reactive path and traffic management that are available for each path, in accordance with one embodiment of the present disclosure.

In one embodiment, in order to perform reactive path and traffic management, each edge network device is provisioned with policy to determine behavior of the edge network device upfront in case certain conditions arise. This policy may be described at a high-level with the associated actions that are to be taken in response to the various conditions that arise. The policy may be configured locally on an edge network device, configured centrally and then distributed using control device 102, or a combination of both.

For illustrative purposes, applications are labeled with simple index numbers (e.g. App1, App2, etc.). In this regard, it is to be understood that each application may have a variety of performance requirements as defined for actual application traffic carried across a live network. Moreover, in an actual deployment, applications may be generally grouped together based on similarities in Service-Level Agreements (SLAs). However, for the sake of simplicity, the examples described herein only deal with single applications. In one embodiment, an application may constitute a flow that is defined by an established pattern or signature involving packet information at any layer between Layer 3 and Layer 7 (e.g. IP-address Pairs, Layer 4 (UDP/TCP) Port pairs, specific Layer 7 application signatures or combinations of any of the prior).

The table below illustrates a sample policy construct, in accordance with one embodiment of the present disclosure.

TABLE 2

Sample Policy Construct

App1
    Forward Error Correction (FEC) dynamic
    Path-eligibility 1, 2, 3
    Equal-Cost Mult-Path (ECMP)
    Path-loss 3
        Police 1 Mbps
    SLA
        Loss 1%
        Latency 100 ms
App2
    Path-eligibility 1, 3
    Path-loss 3
        Shape 1 Mbps
App3
    FEC last-resort
    Path-eligibility 1, 2, 3, 4
    Path-of-last-resort 4
    SLA
        Loss 1%

The various keywords in the policy description above may include the following, in accordance with one embodiment of the present disclosure:

ECMP may designate the enablement of the use of all paths specified with path-eligibility for concurrent load-balancing of traffic.

Forward error correction may designate whether or not forward error correction is available to the application and how forward error correction is engaged. The "dynamic" keyword may indicate that forward error correction will be enabled in case the policy agent on the device is not able to find a path that qualifies against the loss specification where the forward error correction protected traffic may be spread across one or more links. The "last-resort" keyword may indicate that forward error correction will be enabled across a currently used path only, or along the least loss path, in case the loss specification is unable to be met, during conditions when the application traffic is unable to be moved to a different path.

Path-eligibility may designate the paths from Table 1 that are available to the application Path-of-last-resort may designate that the specified path is not to be used unless all the other paths listed under Path-eligibility are down.

Path-loss may designate the action taken when the specified path is no longer available. The action could be police, shape or drop. Loss of all paths may include an inherent drop.

SLA may indicate the required SLA-parameters for the application used to qualify a path for use. Loss, latency and jitter may be specified.

In one embodiment, the above policy may enable the following behavior on a given edge network device:

For App1:
    Allow the use of Paths 1, 2 and 3 with equal cost distribution of traffic based on the routing information received (routing operation is outside the specification of this text)
    Pick one or several paths amongst paths 1, 2 and 3 that delivers less than 1% packet loss
    Use path 4 only if none of the other paths are available
    In case no link delivers less than 1% packet loss then engage forward error correction and use one or several links to deliver the flows subject to forward error correction
    In case Path 3 is unavailable, then police the App1 traffic to 1 Mbps For App2:
    Allow the use of Paths 1 and 3
    In case Path 3 is unavailable, then police the App1 traffic to 1 Mbps For App3:
    Allow the use of Paths 1, 2, 3 and 4
    Pick one path amongst paths 1, 2 and 3 that delivers less than 1% packet loss
    In case no link delivers less than 1% packet loss then engage forward error correction and use the one link with the lowest packet loss to deliver the flows subject to forward error correction
    In case all other paths are unavailable, then engage path 4 and use forward error correction if required Since there are a wide range of permutations that allow for extreme flexibility in terms of how links are used within the defined functionality, the above is simply one example of how the functionality documented herein could be used and the text should not be viewed as limiting in terms of the breadth of applicability and functionality covered.

Figure 2:
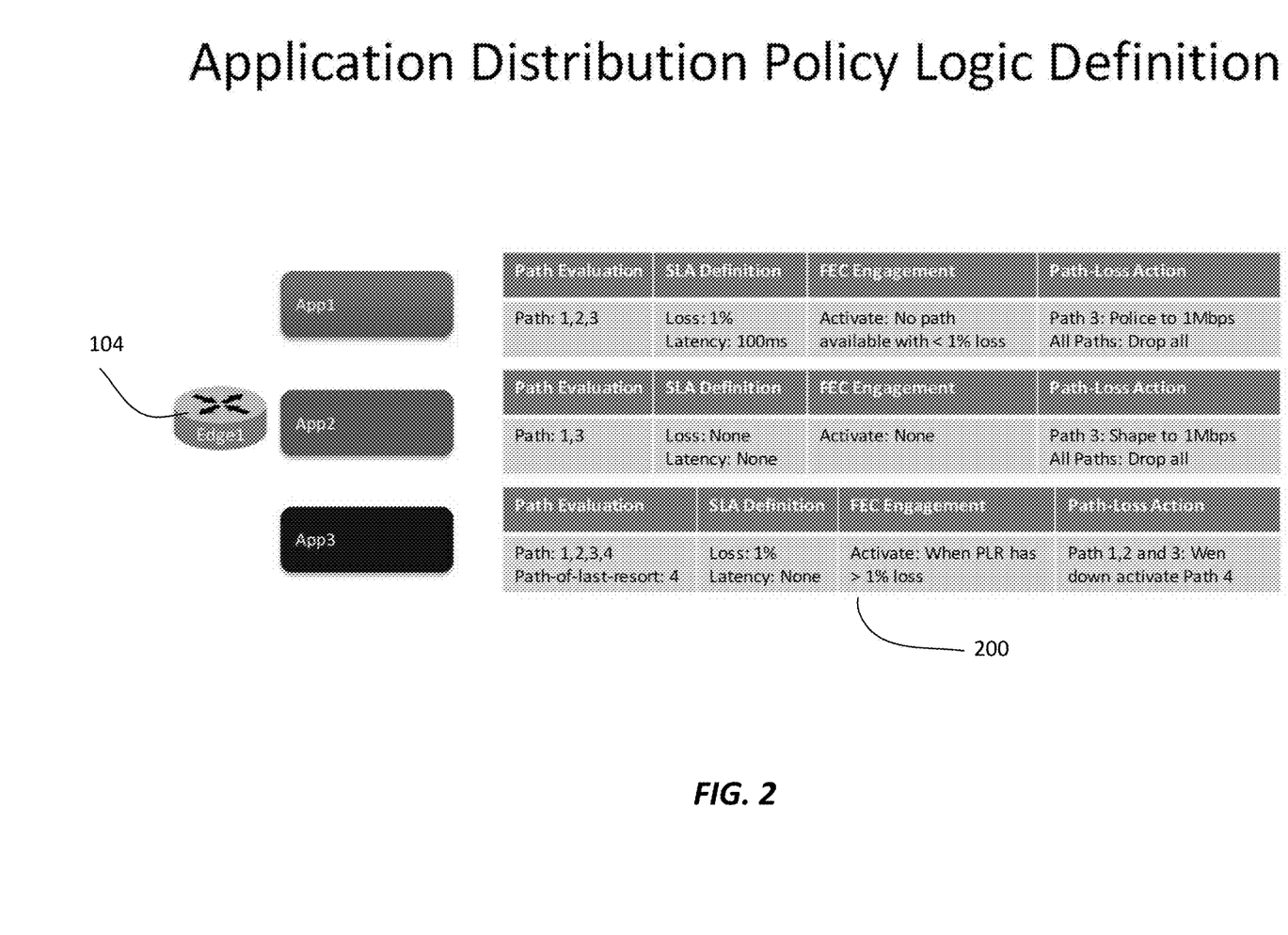
FIG. 2 shows application distribution and policy logic definition for an edge network device of the network, in accordance with one embodiment of the present disclosure.
Figure 3:
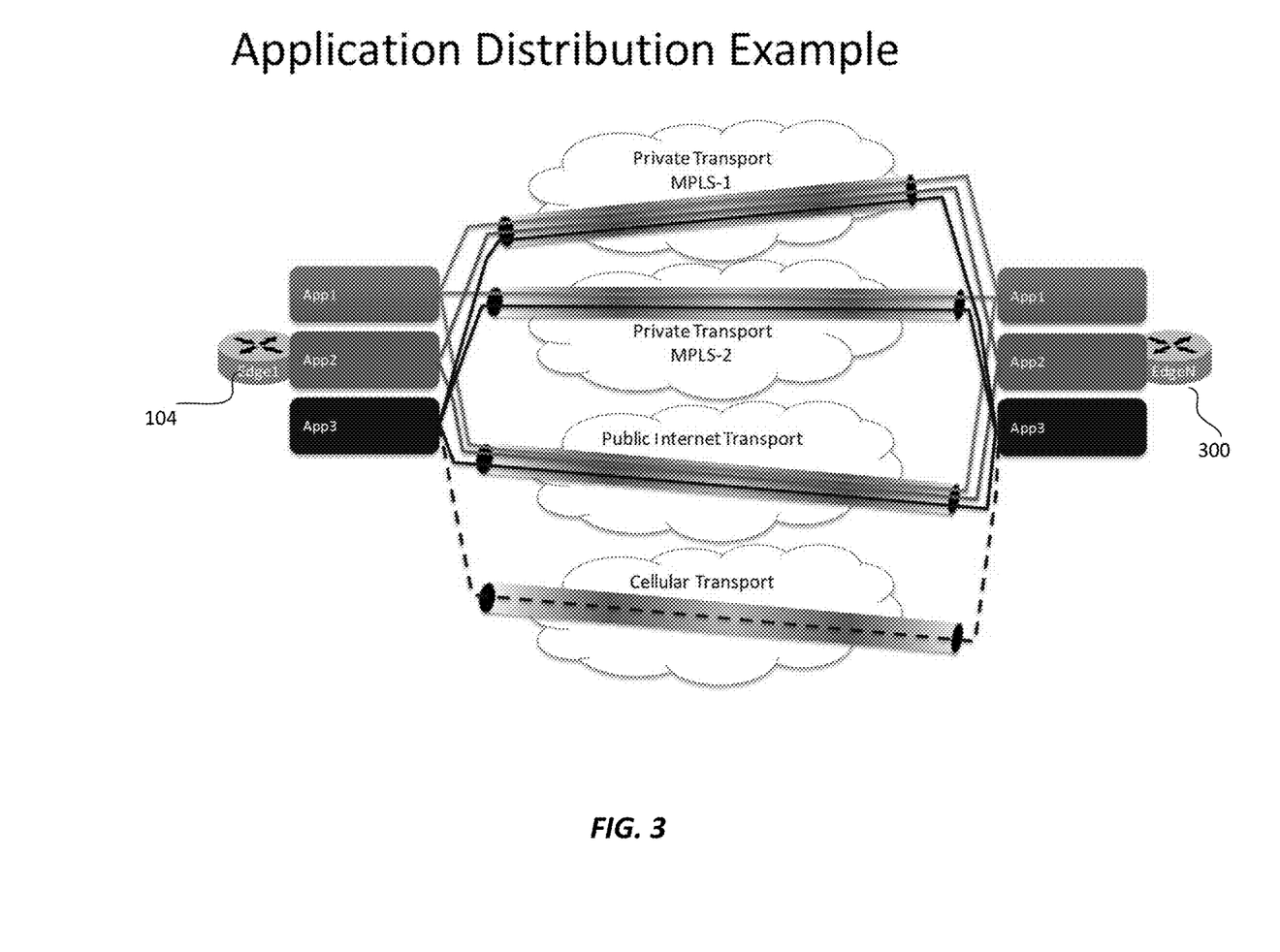
FIG. 3 shows an application distribution example, in accordance with one embodiment of the present disclosure.

In one embodiment, the control device 102 may be used to distribute the reactive path selection policy to the various edge network devices of the network 100. By way of example, FIG. 2 shows the configuration of the edge network device 104 of FIG. 1 in terms of applications and policy. As will be seen, the edge network device 104 is configured for three applications indicated with the labels "app1", "app2", and "app3". The edge network device 104 is also provisioned for the reactive policy indicated by reference numeral 200. In use, the edge network device 104 may be configured to communicate with an edge network device of 300 for the use of various transport networks, as indicated in FIG. 3 of the drawings.

Figure 4:
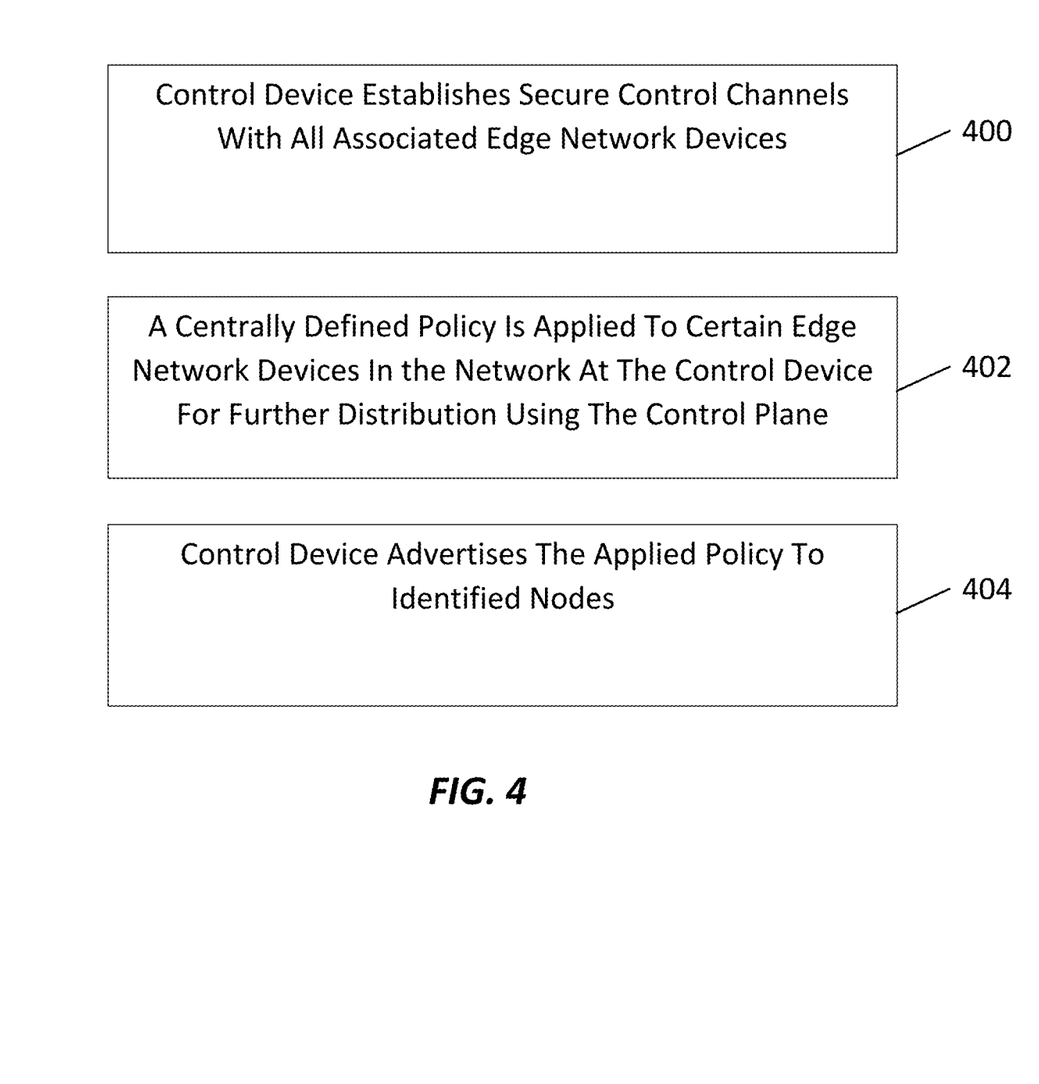
FIG. 4 shows a flowchart of operations performed by a control device for reactive path selection, in accordance with one embodiment of the present disclosure.

To enable the reactive path selection techniques disclosed herein, the control device 102 may be configured to perform operations shown in the flowchart of FIG. 4, in accordance with one embodiment of the present disclosure. Referring to FIG. 4, at block 400 the control device 102 establishes secure control channels with all associated network elements. Thus, for example of the network 100, the control device 102 establishes secure control channels with the edge network devices 104, 106, and 108. At block 402, a centrally defined policy is applied to certain edge network devices in the network at the control device 102 for further distribution using the control plane. For example, an administrator may designate certain edge network devices to receive the centrally defined policy. At block 404, the control device 102 distributes the policy to the edge network devices of the network 100 affected by the policy using the control plane.

Figure 5:
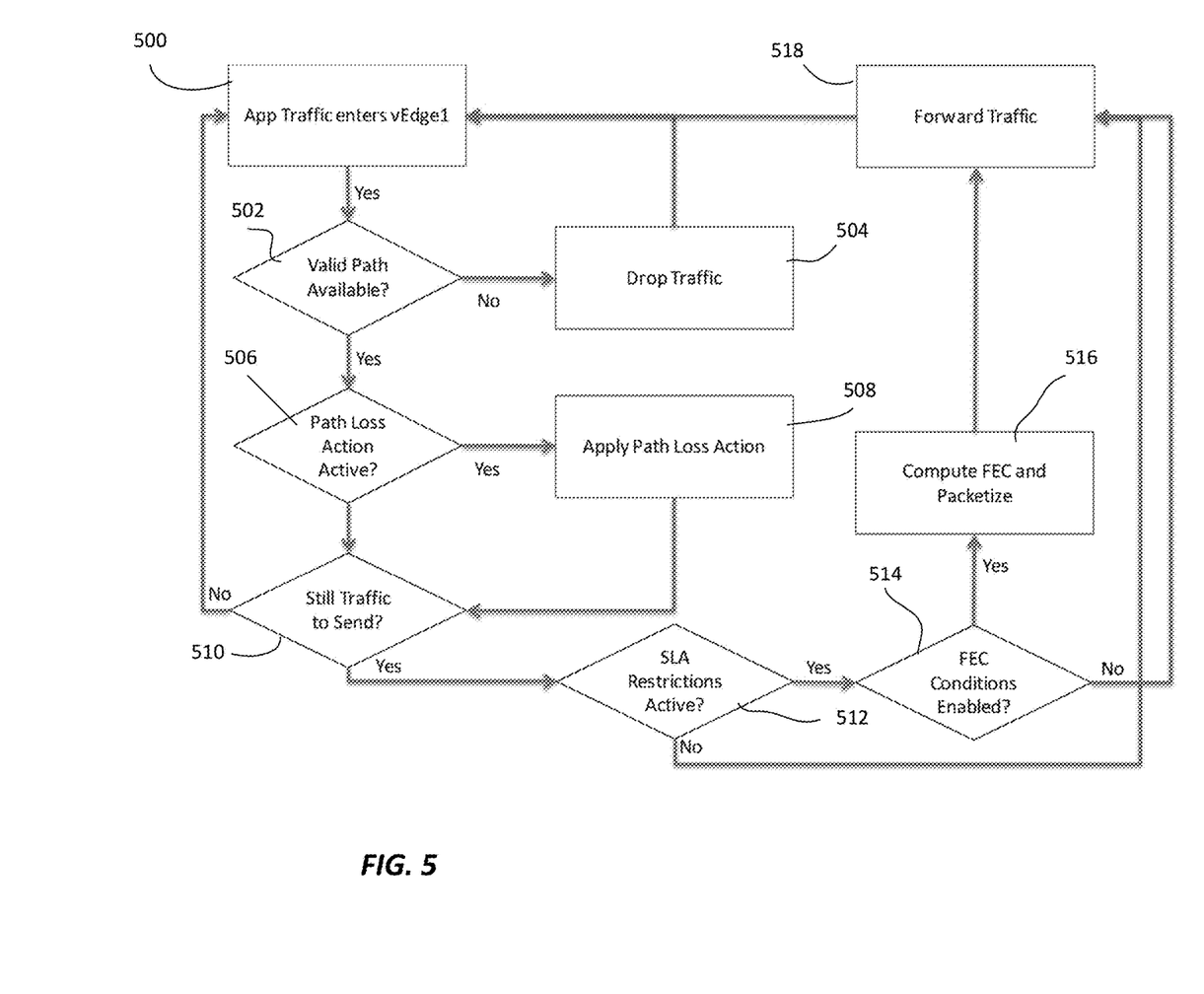
FIG. 5 shows a flowchart of operations performed by an endpoint such as an edge network device for reactive path selection, in accordance with one embodiment of the present disclosure.

Referring now to FIG. 5 of the drawings, there is shown a flowchart of operations performed by the edge network device 104 to perform reactive path selection, in accordance with one embodiment of the present disclosure. As will be seen, at block 500, application traffic is received by the edge network device 104. At block 502 a determination may be made if there is a valid path available for transmission of the traffic. If no valid path is available, then at block 504, the traffic is dropped. However, if there is a valid path, then at block 506 a determination may be made if a path loss action is active. This step may be performed by looking up the policy for reactive path selection available to the edge network device 104. If a determination is made that a path loss action is active then at block 508, the path loss action is applied. In one embodiment, traffic that does not require a path loss action and/or traffic with a path lass action applied may be sent to block 512 via the control block 510. At the block 512, if no Service Level Agreement (SLA) restrictions apply, the traffic may be forwarded at block 518. For traffic with SLA restrictions active, a determination may be made if forward error correction conditions are enabled at block 514. If forward error correction conditions are enabled, at block 516 the forward error correction is computed, and the traffic is forwarded at block 518. If forward error correction conditions are not enabled, the traffic is forwarded at the block 518.

Figure 6:
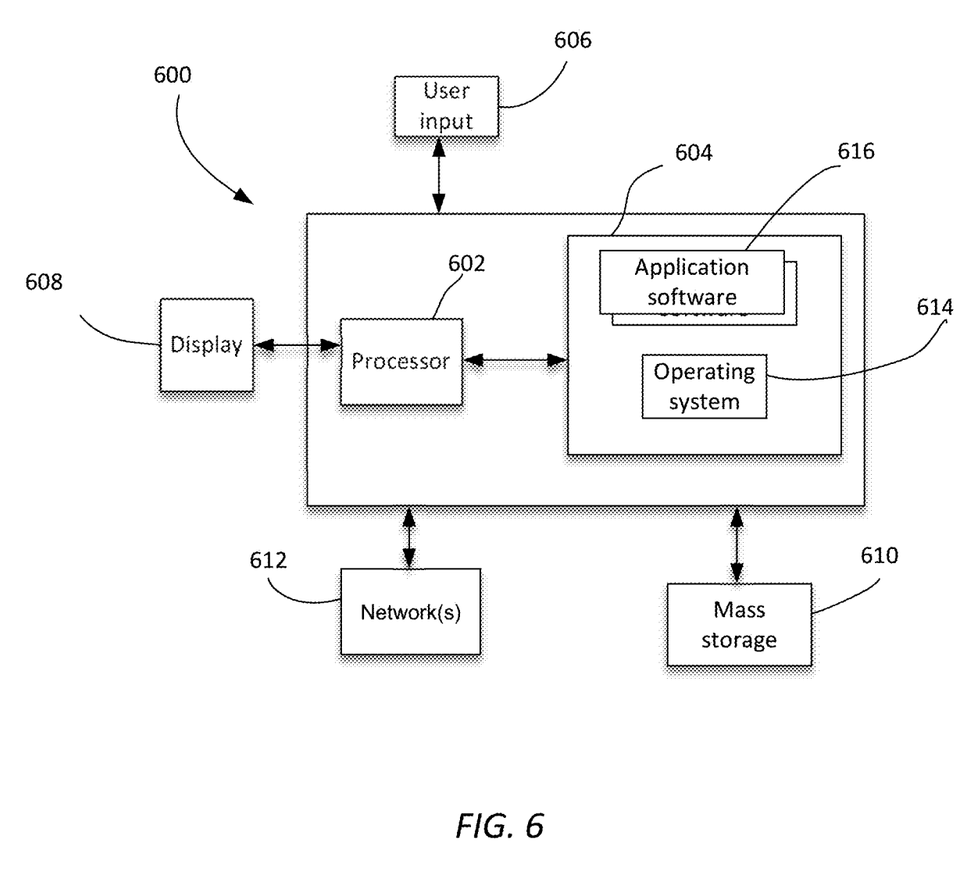
FIG. 6 shows a high-level block diagram for an overlay control device, in accordance with one embodiment of the present disclosure.

FIG. 6 shows an example of hardware 600 that may be used to implement the overlay control device 102, in accordance with one embodiment. The hardware 600 may include at least one processor 602 coupled to a memory 604. The processor 602 may represent one or more processors (e.g., microprocessors), and the memory 604 may represent random access memory (RAM) devices comprising a main storage of the hardware, as well as any supplemental levels of memory e.g., cache memories, non-volatile or back-up memories (e.g. programmable or flash memories), read-only memories, etc. In addition, the memory 604 may be considered to include memory storage physically located elsewhere in the hardware, e.g. any cache memory in the processor 602, as well as any storage capacity used as a virtual memory, e.g., as stored on a mass storage device.

The hardware also typically receives a number of inputs and outputs for communicating information externally. For interface with a user or operator, the hardware may include one or more user input output devices 606 (e.g., a keyboard, mouse, etc.) and a display 608. For additional storage, the hardware 600 may also include one or more mass storage devices 610, e.g., a Universal Serial Bus (USB) or other removable disk drive, a hard disk drive, a Direct Access Storage Device (DASD), an optical drive (e.g. a Compact Disk (CD) drive, a Digital Versatile Disk (DVD) drive, etc.) and/or a USB drive, among others. Furthermore, the hardware may include an interface with one or more networks 612 (e.g., a local area network (LAN), a wide area network (WAN), a wireless network, and/or the Internet among others) to permit the communication of information with other computers coupled to the networks. The hardware may include suitable analog and/or digital interfaces between the processor 602 and each of the components.

The hardware 600 operates under the control of an operating system 614, and executes application software 616 which includes various computer software applications, components, programs, objects, modules, etc. to perform the techniques described above.

In general, the routines executed to implement the embodiments of the present disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the present disclosure. Moreover, while the present disclosure has been described in the context of fully functioning computers and computer systems, those skilled in the art will appreciate that the various embodiments of the present disclosure are capable of being distributed as a program product in a variety of forms, and that the present disclosure applies equally regardless of the particular type of machine or computer-readable media used to actually effect the distribution. Examples of computer-readable media include but are not limited to recordable type media such as volatile and non-volatile memory devices, USB and other removable media, hard disk drives, optical disks (e.g., Compact Disk Read-Only Memory (CD ROMS), Digital Versatile Disks, (DVDs), etc.), flash drives, among others.

Figure 7:
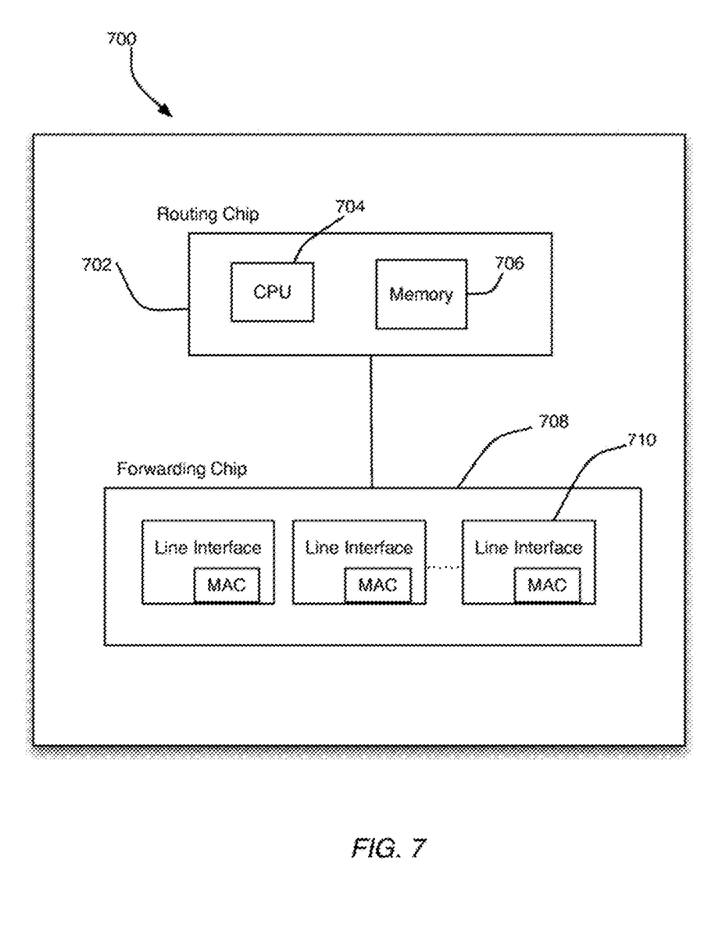
FIG. 7 shows a high-level block diagram of hardware for a router, in accordance with one embodiment of the present disclosure.

FIG. 7 shows a block diagram of hardware 700 for edge network devices described above, in accordance with one embodiment of the present disclosure. Referring to FIG. 7, the hardware 700 includes a routing chip 702 coupled to a forwarding chip 708. The routing chip 702 performs functions such as path computations, routing table maintenance, and reachability propagation. Components of the routing chip include a CPU or processor 704, which is coupled to a memory 706. The memory stores instructions to perform the methods disclosed herein. The forwarding chip is responsible for packet forwarding along a plurality of line interfaces 710.

Although the present disclosure has been described with reference to specific exemplary embodiments, it will be evident that the various modification and changes can be made to these embodiments without departing from the broader spirit of the present disclosure. Accordingly, the specification and drawings are to be regarded in an illustrative sense rather than in a restrictive sense.

The invention claimed is:

1. A method for routing, comprising:
 receiving traffic at an endpoint in a network, the traffic being specific to an application on the endpoint, and the endpoint having an specific reactive path selection policy specific to the application the specific path selection policy including for the application forward error correction (FEC) criteria defining if FEC is available to the application and how FEC is to be engaged, service level agreement (SLA) criteria that defines the qualifications of a transmission path for use, and path loss actions defining one or more actions taken when a valid path is no longer available;
 identifying a valid path that is available and dropping the received traffic in response to a lack of an available valid path;
 applying to the traffic any applicable a path loss action from the reactive path selection policy;
 for any of the traffic remaining to be transmitted after the identifying and applying:
  first determining whether any SLA criteria restricts transmission of the traffic, and transmitting the traffic in response to a negative result of the first determining;
  second determining, in response to a positive result of the first determining, whether any FEC criteria restricts transmission of the traffic, and transmitting the traffic in response to a negative result of the second determining;
  compute, in response to a positive result of the second determining, forward error correction of the traffic, and then forwarding the traffic.

2. The method of claim 1, wherein the specific reactive path selection policy is specific to the application and includes path eligibility criteria the defines the paths that are available to the application to transmit.

3. The method of claim 2, wherein path eligibility criteria includes designation of a path of last resort as only to be used when all other paths are unavailable.

4. The method of claim 1, wherein the one or more actions of the path loss actions include police bandwidth allocation of the traffic, shape the traffic, and drop the traffic.

5. The method of claim 4, wherein the one or more actions of the path loss actions are path specific and include police bandwidth allocation of the traffic, shape the traffic, and drop the traffic.

6. The method of claim 1, wherein the SLA criteria includes predefined levels of tolerable latency and jitter.

7. The method of claim 1, wherein the endpoint has a plurality of different applications each with different respective reactive path selection policy, and the method is performed independently for traffic to any particular application of the different applications.

8. A non-transitory media containing instructions which when executed by a router cause the router to perform operations comprising:
 receiving traffic at an endpoint in a network, the traffic being specific to an application on the endpoint, and the endpoint having an specific reactive path selection policy specific to the application the specific path selection policy including for the application forward error correction (FEC) criteria defining if FEC is available to the application and how FEC is to be engaged, service level agreement (SLA) criteria that defines the qualifications of a transmission path for use, and path loss actions defining one or more actions taken when a valid path is no longer available;
 identifying a valid path that is available and dropping the received traffic in response to a lack of an available valid path;
 applying to the traffic any applicable a path loss action from the reactive path selection policy;
 for any of the traffic remaining to be transmitted after the identifying and applying:
  first determining whether any SLA criteria restricts transmission of the traffic, and transmitting the traffic in response to a negative result of the first determining;
  second determining, in response to a positive result of the first determining, whether any FEC criteria restricts transmission of the traffic, and transmitting the traffic in response to a negative result of the second determining;
  compute, in response to a positive result of the second determining, forward error correction of the traffic, and then forwarding the traffic.

9. The non-transitory media of claim 8, wherein the specific reactive path selection policy is specific to the application and includes path eligibility criteria the defines the paths that are available to the application to transmit.

10. The non-transitory media of claim 9, wherein path eligibility criteria includes designation of a path of last resort as only to be used when all other paths are unavailable.

11. The non-transitory media of claim 8, wherein the one or more actions of the path loss actions include police bandwidth allocation of the traffic, shape the traffic, and drop the traffic.

12. The non-transitory media of claim 11, wherein the one or more actions of the path loss actions are path specific and include police bandwidth allocation of the traffic, shape the traffic, and drop the traffic.

13. The non-transitory media of claim 8, wherein the SLA criteria includes predefined levels of tolerable latency and jitter.

14. The non-transitory media of claim 8, wherein the endpoint has a plurality of different applications each with different respective reactive path selection policy, and the media is performed independently for traffic to any particular application of the different applications.

15. A router having a processor and a memory and storing instructions which when executed by a router cause the router to perform operations comprising:
 receiving traffic at an endpoint in a network, the traffic being specific to an application on the endpoint, and the endpoint having an specific reactive path selection policy specific to the application the specific path selection policy including for the application forward error correction (FEC) criteria defining if FEC is available to the application and how FEC is to be engaged, service level agreement (SLA) criteria that defines the qualifications of a transmission path for use, and path loss actions defining one or more actions taken when a valid path is no longer available;
 identifying a valid path that is available and dropping the received traffic in response to a lack of an available valid path;
 applying to the traffic any applicable a path loss action from the reactive path selection policy;
 for any of the traffic remaining to be transmitted after the identifying and applying: first determining whether any SLA criteria restricts transmission of the traffic, and transmitting the traffic in response to a negative result of the first determining;
 second determining, in response to a positive result of the first determining, whether any FEC criteria restricts transmission of the traffic, and transmitting the traffic in response to a negative result of the second determining;
 compute, in response to a positive result of the second determining, forward error correction of the traffic, and then forwarding the traffic.

16. The router of claim 15, wherein the specific reactive path selection policy is specific to the application and includes path eligibility criteria the defines the paths that are available to the application to transmit.

17. The router of claim 16, wherein path eligibility criteria includes designation of a path of last resort as only to be used when all other paths are unavailable.

18. The router of claim 15, wherein the one or more actions of the path loss actions include police bandwidth allocation of the traffic, shape the traffic, and drop the traffic.

19. The router of claim 18, wherein the one or more actions of the path loss actions are path specific and include police bandwidth allocation of the traffic, shape the traffic, and drop the traffic.

20. The router of claim 15, wherein the SLA criteria includes predefined levels of tolerable latency and jitter.

* * * * *